United States Patent [19]

Ichikawa

[11] Patent Number: 5,440,922
[45] Date of Patent: Aug. 15, 1995

[54] APPARATUS FOR DETECTING MISFIRE IN INTERNAL COMBUSTION ENGINES FOR VEHICLES

[75] Inventor: Akira Ichikawa, Chiryu, Japan

[73] Assignee: Nippondenso Co., Ltd., Kariya, Japan

[21] Appl. No.: 126,609

[22] Filed: Sep. 27, 1993

Related U.S. Application Data

[62] Division of Ser. No. 785,321, Oct. 31, 1991, Pat. No. 5,263,453.

[30] Foreign Application Priority Data

| Nov. 1, 1990 | [JP] | Japan | 2-296662 |
| Nov. 27, 1990 | [JP] | Japan | 2-327442 |
| Nov. 27, 1990 | [JP] | Japan | 2-327443 |
| Nov. 28, 1990 | [JP] | Japan | 2-333303 |
| Mar. 19, 1991 | [JP] | Japan | 3-054898 |

[51] Int. Cl.⁶ .................................. G01M 15/00
[52] U.S. Cl. ........................ 73/117.3; 364/431.08
[58] Field of Search ............. 73/117.2, 117.3, 116; 364/431.07, 431.08

[56] References Cited

U.S. PATENT DOCUMENTS

| 4,932,379 | 6/1990 | Tang et al. | 73/117.3 |
| 5,035,220 | 7/1991 | Uchinami et al. | |
| 5,044,195 | 9/1991 | James et al. | 73/117.3 |
| 5,105,657 | 4/1992 | Nakaniwa | 73/117.3 |
| 5,109,695 | 5/1992 | James et al. | 73/117.3 |
| 5,158,059 | 10/1992 | Kuroda | |
| 5,191,788 | 3/1993 | Nishimura | 73/117.3 |
| 5,197,325 | 3/1993 | Tamura et al. | 73/117.3 |
| 5,239,473 | 8/1993 | Ribbens et al. | 73/117.3 |
| 5,263,365 | 11/1993 | Müller et al. | 364/431.08 |
| 5,263,453 | 11/1993 | Wakahara et al. | 73/117.3 |
| 5,275,037 | 1/1994 | Nakayama et al. | 73/117.3 |
| 5,287,282 | 2/1994 | Imai | 364/431.08 |
| 5,357,790 | 10/1994 | Hosoya | 364/431.08 |

FOREIGN PATENT DOCUMENTS

| 56-143326 | 11/1981 | Japan |
| 58-19532 | 2/1983 | Japan |
| 58-51243 | 3/1983 | Japan |
| 61-258955 | 11/1986 | Japan |
| 62-199949 | 9/1987 | Japan |
| 2-33447 | 2/1990 | Japan |
| 230954 | 2/1990 | Japan |
| 261368 | 3/1990 | Japan |
| 4112950 | 4/1992 | Japan |

OTHER PUBLICATIONS

SAE 900232—Methods of On-Board Misfire Detection—Gunter Plapp et al. pp. 9–19 (see Application p. 1).

*Primary Examiner*—Richard E. Chilcot, Jr.
*Assistant Examiner*—George M Dombroske
*Attorney, Agent, or Firm*—Cushman, Darby & Cushman

[57] ABSTRACT

An apparatus for detecting a misfire in an internal combustion engine includes a rotational signal outputting unit for outputting a rotational signal corresponding to a rotational position of the engine, an average rotational angular speed computing unit for computing an average rotational angular speed of the engine based on the rotational signal, a deviation computing unit for computing a deviation of a computation result of the average rotational angular speed computing unit at every predetermined rotational position, and a misfire determining unit for determining occurrence of a misfire based on a pattern of the relative magnitude of three consecutive values of the deviations obtained at every predetermined rotational position. Further, the misfire determining unit may use a difference of the deviation, which is computed separately, in place of the deviation itself.

5 Claims, 15 Drawing Sheets (TO STEP 200)

FIG. 7

| ELAPSED TIME Ta | Ta1 | Ta2 | Ta3 | Ta4 | Ta5 | Ta6 |
|---|---|---|---|---|---|---|
| FUEL SUPPLY RESUMPTION TIME CORRECTION COEFFICIENT CKD1 | 1.0 | 0.5 | 0.3 | 0.2 | 0.1 | 0.05 |

FIG. 8

| ELAPSED TIME Tb | Tb1 | Tb2 | Tb3 | Tb4 | Tb5 | Tb6 |
|---|---|---|---|---|---|---|
| AIR CONDITIONER OPERATION TIME CORRECTION COEFFICIENT CKD2 | 0.9 | 0.4 | 0.2 | 0 | -0.1 | -0.2 |

FIG. 9

| ELAPSED TIME Tc | Tc1 | Tc2 | Tc3 | Tc4 | Tc5 | Tc6 |
|---|---|---|---|---|---|---|
| AIR CONDITIONER STOP TIME CORRECTION COEFFICIENT CKD3 | 1.0 | 0.5 | 0.3 | 0.2 | 0.1 | 0.05 |

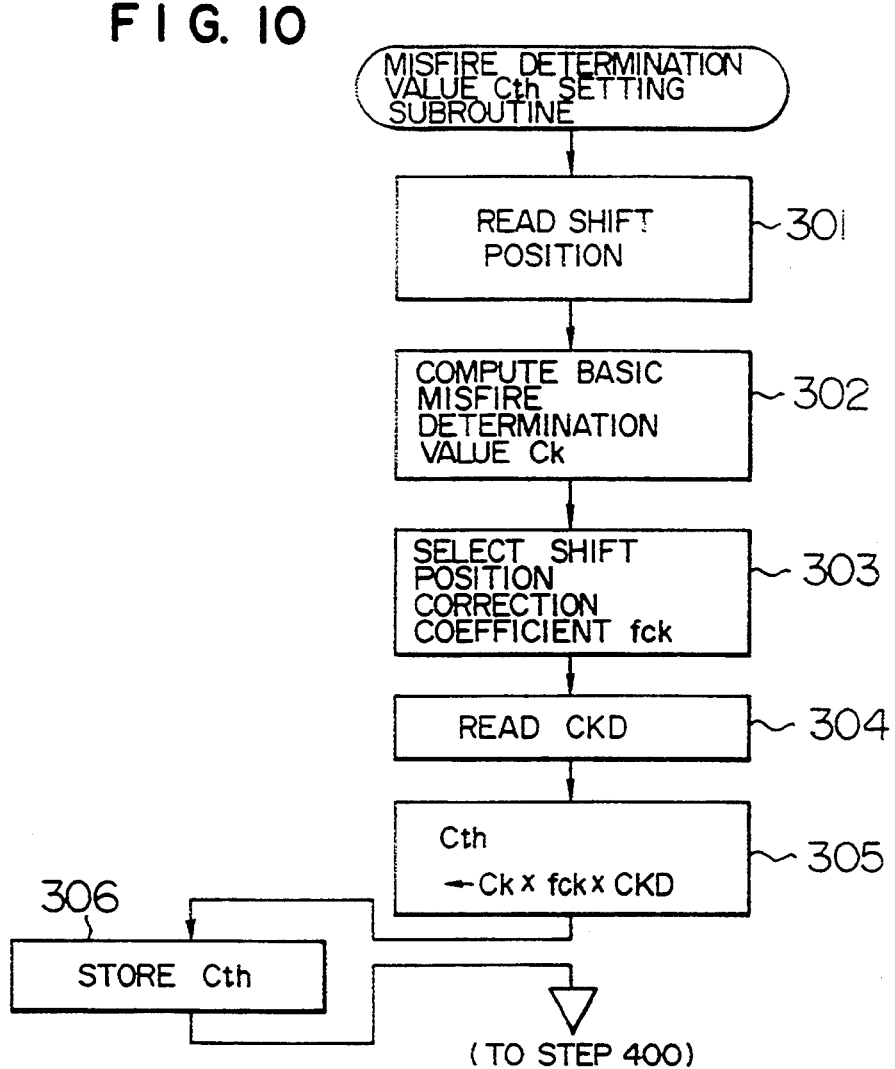
FIG. 10
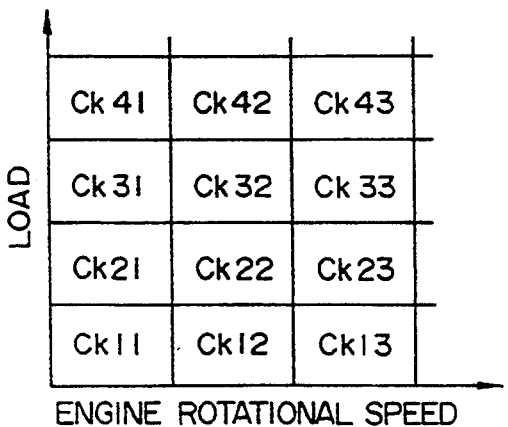
FIG. 11
FIG. 12

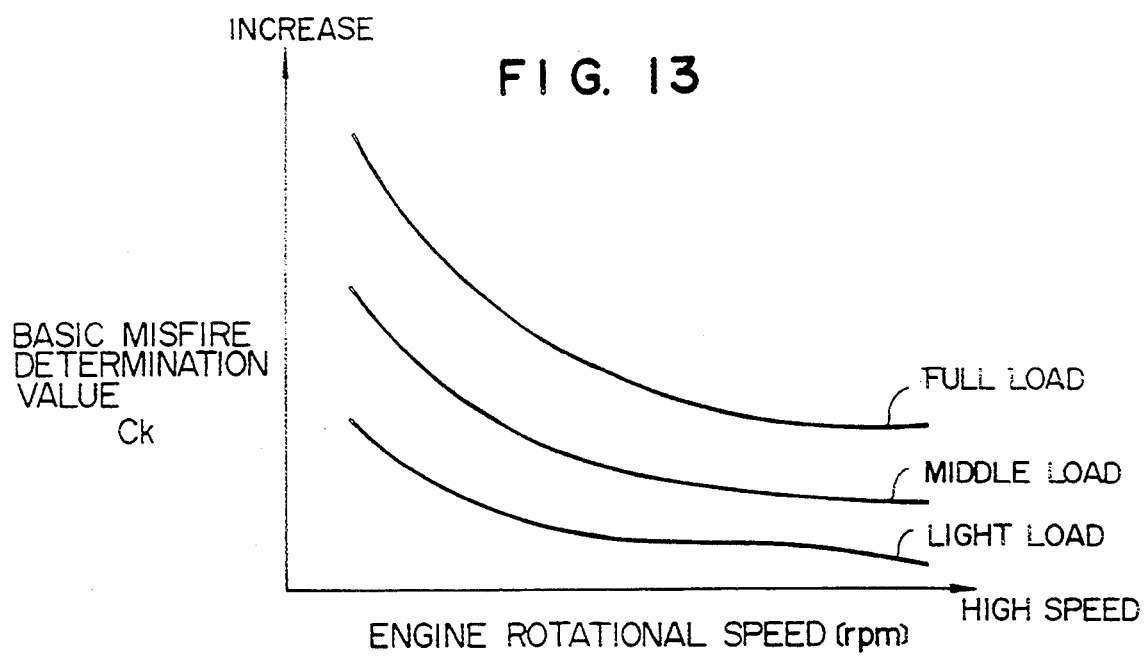
FIG. 13
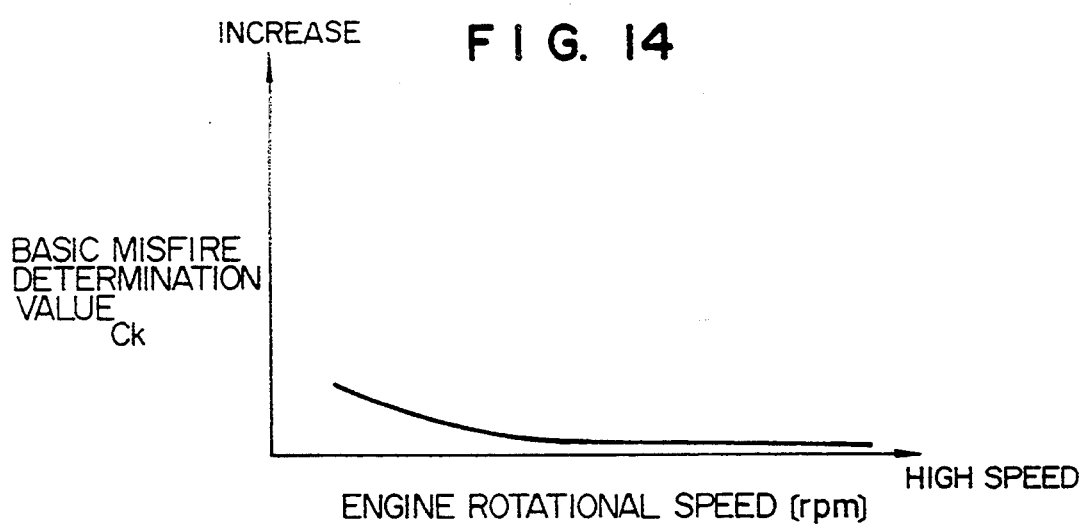
FIG. 14
FIG. 15
| FIRST SPEED | SECOND SPEED | THIRD SPEED | FOURTH SPEED | FIFTH SPEED | NEUTRAL OR CLUTCH SWITCH OFF |
|---|---|---|---|---|---|
| fck1 | fck2 | fck3 | fck4 | fck5 | fckn |

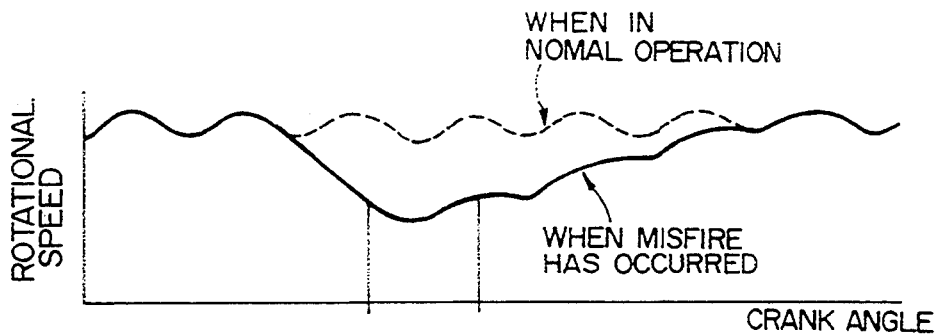
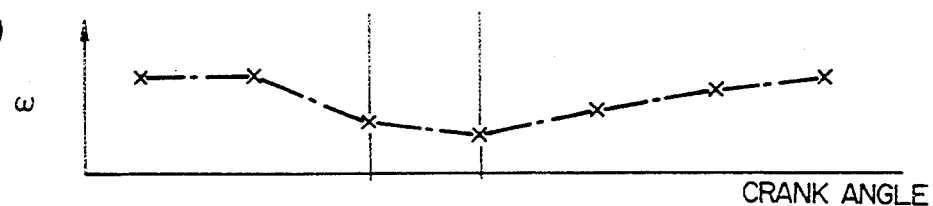
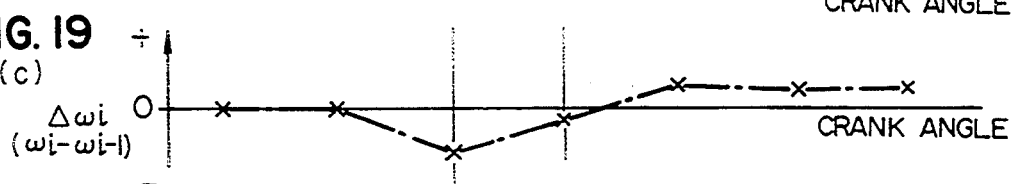
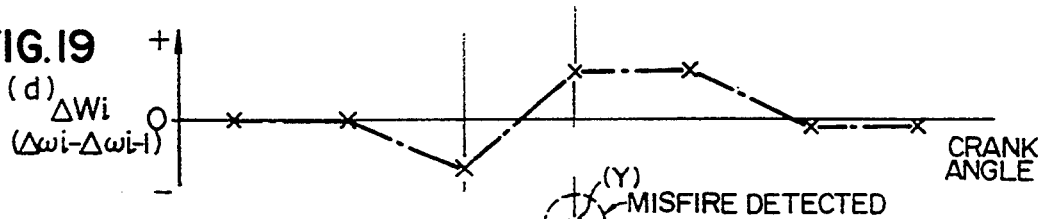
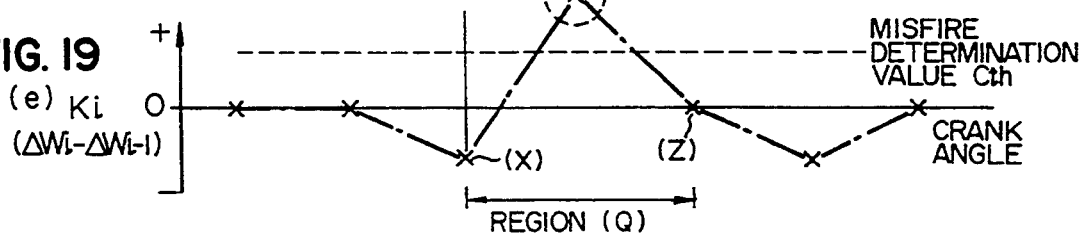

F I G. 23

| R14 $X_{fc}=0$ | R24 $X_{fc}=0$ | R34 $X_{fc}=1$ | R44 $X_{fc}=1$ |
|---|---|---|---|
| R13 $X_{fc}=0$ | R23 $X_{fc}=0$ | R33 $X_{fc}=0$ | R43 $X_{fc}=1$ |
| R12 $X_{fc}=0$ | R22 $X_{fc}=0$ | R32 $X_{fc}=0$ | R42 $X_{fc}=0$ |
| R11 $X_{fc}=0$ | R21 $X_{fc}=0$ | R31 $X_{fc}=0$ | R41 $X_{fc}=0$ |

ENGINE LOAD

ENGINE ROTATIONAL SPEED

APPARATUS FOR DETECTING MISFIRE IN INTERNAL COMBUSTION ENGINES FOR VEHICLES

This is a division of application Ser. No. 07/785,321, filed Oct. 31, 1991, now U.S. Pat. No. 5,263,453.

FIELD OF THE INVENTION

The present invention relates to an apparatus for detecting a misfire in an internal combustion engine for a vehicle (hereinafter referred to simply as "engine").

DESCRIPTION OF RELATED ART

Conventional detection of a misfire in an engine performed by a conventional detecting apparatus comprises the steps of detecting a rotational speed of the engine at least at two points in one ignition cycle, determining an amount of change in the rotational speed from the detected rotational speeds and determining whether a misfire has occurred by comparing the amount of change in the rotational speed of the engine or a result of statistic processing of the amount of change in the rotational speed with a misfire determination value obtained in accordance with an operating condition of the engine, since the rotational speed of the engine decreases when a misfire occurs (refer to JP-A-58-51243 and SAE 900232).

SUMMARY OF THE INVENTION

However, the misfire determination value is preset in such a conventional apparatus on the assumption that the engine is in a steady operating condition. There has been a problem such that accurate misfire determination can not be performed when the engine is in a transient condition, such as when the vehicle is under an accelerating condition.

The present invention was made to solve the foregoing problem.

It is an object of the present invention to provide a misfire detecting apparatus which is capable of detecting a misfire with high accuracy by one and the same detecting method when an engine is in either one of a steady operating condition and a transient condition.

In order to attain the above-mentioned object, as shown in the functional block diagram of FIG. 1, the present invention provides an apparatus for detecting a misfire in an internal combustion engine for a vehicle, comprising: means for detecting a rotational speed of the engine; means for computing a change quantity of the rotational speed of the engine based on an output signal from the rotational speed detecting means; means for detecting a load on the engine; means for setting a correction coefficient to correct a misfire determination value based on a result of detection of the load detecting means; means for setting the misfire determination value based on a result set by the misfire determination value correction coefficient setting means; means for determining whether a misfire has occurred in the engine by comparing the change quantity of the rotational speed of the engine supplied from the rotational speed change quantity computing means with the misfire determination value supplied from the misfire determination value setting means; means for invalidating a result of misfire determination by the misfire determining means when it has been determined that at least one of the vehicle and the engine is in such an operating condition that misdetermination of a misfire is apt to be made; and means for stopping or continuing fuel supply to the engine in accordance with a result of misfire determination by the misfire determining means, a result of invalidation processing made by the misfire determination result invalidating means and whether the engine operating condition corresponds to an engine operating condition stored in a storage in which a misfire has occurred.

BRIEF DESCRIPTION OF THE DRAWINGS

FIG. 7 shows a map for obtaining a fuel supply resumption time correction coefficient CKD1;

FIG. 8 shows a map for obtaining an air conditioner operation time correction coefficient CKD2;

FIG. 9 shows a map for obtaining an air conditioner stop time correction coefficient CKD3;

FIG. 10 shows a flow chart explaining the execution of a misfire determination value setting subroutine in step 300 in FIG. 4;

FIG. 11 shows a two-dimensional map for setting a basic misfire determination value Ck when the engine is not idling;

FIG. 12 shows a map for setting a basic misfire determination value Ck when the engine is idling;

FIG. 13 is a characteristic diagram showing the relation between the engine rotational speed and the basic misfire determination value Ck when the engine is not idling;

FIG. 14 is a characteristic diagram showing the relation between the engine rotational speed and the basic misfire determination value Ck when the engine is idling;

FIG. 15 shows a map for setting a shift position correction coefficient fck;

FIGS. 19(a) and 19(e) show rotational speed change characteristics of the engine when the engine is in a steady operating condition;

FIG. 23 shows a two-dimensional map in which fuel cut flags Xfc are stored.

DESCRIPTION OF THE PREFERRED EMBODIMENTS

The present invention will be described with reference to the accompanying drawings.

Figure 1:
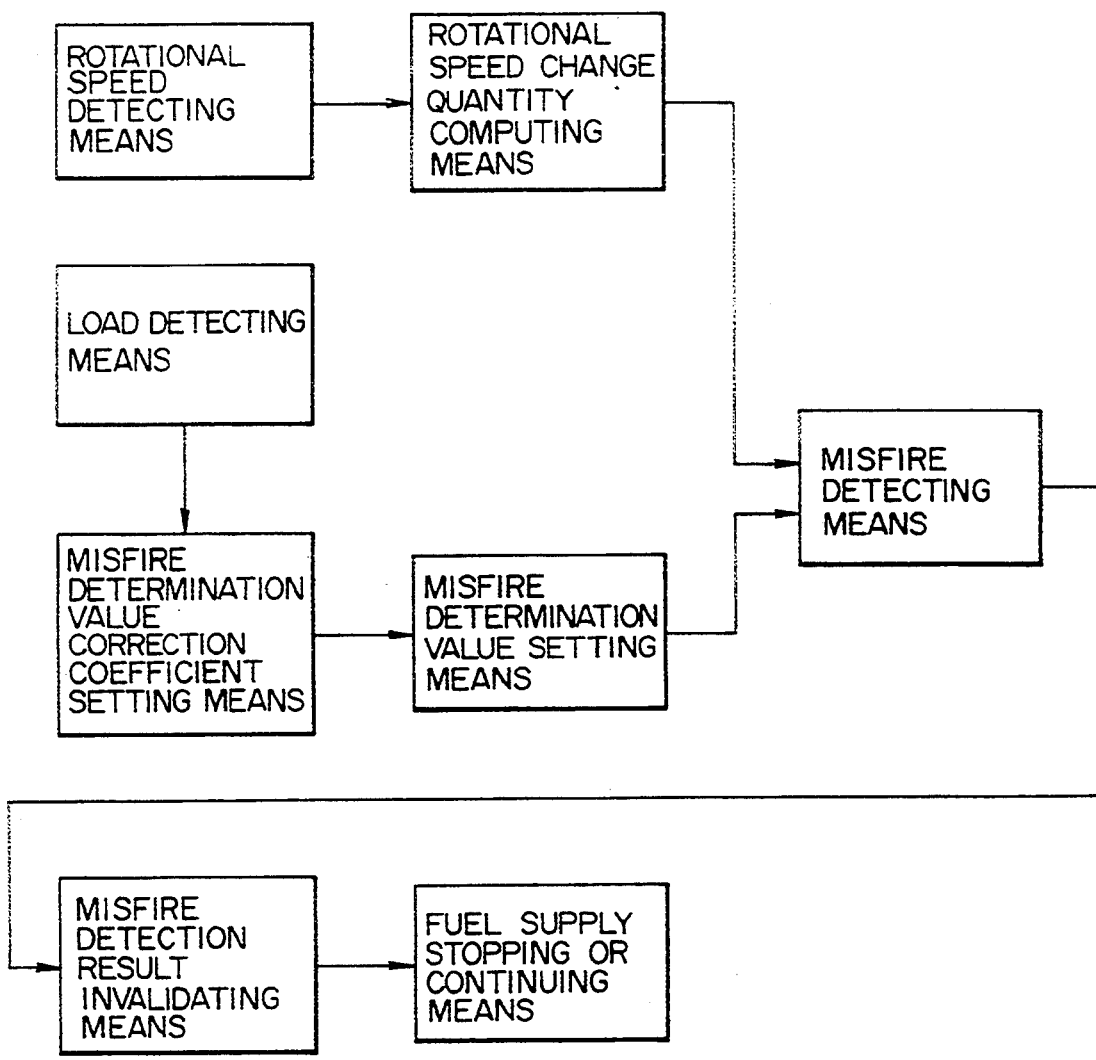
FIG. 1 is a functional block diagram illustrating the functions of an apparatus of the present invention.

FIG. 1 is a functional block diagram illustrating the functions of an internal engine misfire detecting apparatus of the present invention.

Figure 2:
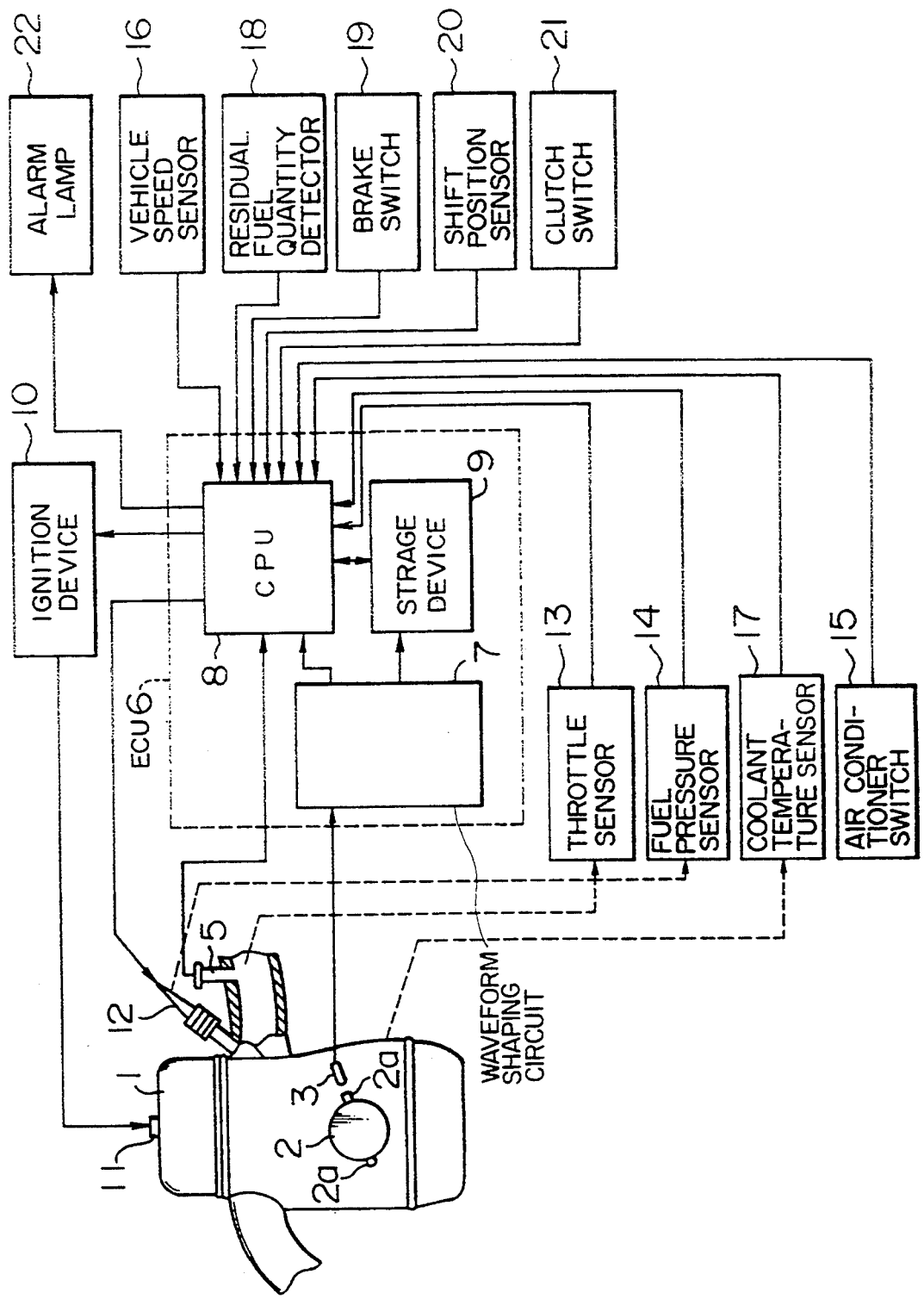
FIG. 2 is a structural diagram showing a general construction of an apparatus of an embodiment of the present invention.

FIG. 2 is a structural diagram showing a structure of a misfire detecting apparatus of an embodiment of the present invention.

In FIG. 2, reference numeral 1 denotes a four-cycle engine having four cylinders; 2 a signal rotor mounted on a crank shaft or cam shaft of the engine 1. The signal rotor 2 has projections 2a disposed at a given crank angle of each cylinder. In this embodiment, the projections 2a are provided at each crank angle at which a piston of the engine 1 is at its top dead center position (hereinafter referred to as TDC). Reference numeral 3 denotes a crank angle sensor which serves as rotational signal producing means which detects TDC of each cylinder by the projections 2a of the signal rotor 2 and inputs a TDC signal to a waveform shaping circuit 7; 5 an intake pipe pressure sensor for detecting pressure in an intake pipe. A detection signal from the intake pipe pressure sensor 5 is input to an electronic control unit 6 which will be described hereinafter. Reference numeral 13 denotes a throttle sensor for detecting an opening degree of a throttle valve (not shown) which adjusts an intake air quantity into a cylinder; 14 a fuel pressure sensor for detecting pressure of fuel injected into each cylinder, which fuel pressure sensor 14 is disposed on a fuel tube between a fuel injector 12, which will be described hereinafter, and a fuel pressure regulator (not shown) for regulating pressure of fuel supplied to the injector 12; 16 a vehicle speed sensor for detecting a vehicle speed, for example, by a rotational force of a speed meter cable. A detection signal from each sensor is input to the electronic control unit 6.

Reference numeral 17 denotes a sensor for detecting a temperature of a coolant of the engine; 18 a detector for detecting a residual fuel quantity in a fuel tank (not shown); 19 a brake switch for detecting whether a driver has depressed a foot brake or has pulled a hand brake; 20 a shift position sensor for detecting a shift position, which is mounted on a transmission (not shown); and 21 a clutch switch for detecting whether a clutch is connected or disconnected by a depression degree of a clutch pedal. A detection signal from each of the sensors 17 to 21 is input to the electronic control unit 6 (hereinafter referred to as ECU) which outputs signals for providing optimum fuel injection and ignition timing based on the signals from the crank angle sensor 3, the intake pipe pressure sensor 5, the throttle sensor 13 and the vehicle speed sensor 16. ECU 6 is a microcomputer which comprises the waveform shaping circuit 7 for converting the signal from the crank angle sensor 3 into a rectangular wave signal, a central processing unit 8 for performing computation for the determination of a misfire, and a storage device 9 for storing therein information necessary for the computation and results of the computation.

Reference numeral 10 denotes an ignition device for generating a high voltage at optimum ignition timing based on output signals from the ECU 6 and supplying the high voltage to ignition plugs 11 of the engine; 12 an injector for supplying an optimum quantity of fuel to be injected based on the output signal from the ECU 6; and 22 an alarm lamp responsive to a result of misfire determination by the ECU 6 to be turned on to alarm a vehicle driver when a misfire has occurred.

FIGS. 3(a) and 3(b) show waveforms which illustrate conversion of the signal from the crank angle sensor 3 into a rectangular wave signal in the waveform shaping circuit 7. FIG. 3(a) shows a signal outputted from the crank angle sensor 3 at each TDC point in the compression stroke of each cylinder. The TDC signal in the compression stroke is output at every (crank angle) 180° C.A in the embodiment of a four cycle engine having four cylinders. FIG. 3(b) shows a signal which has been converted from the signal output from the crank angle sensor 3. Each rising edge of the rectangular wave signal represents a TDC point. A time interval from a preceding rising edge of the rectangular wave signal to a current rising edge of the rectangular wave signal is represented as T180.

Figure 4:
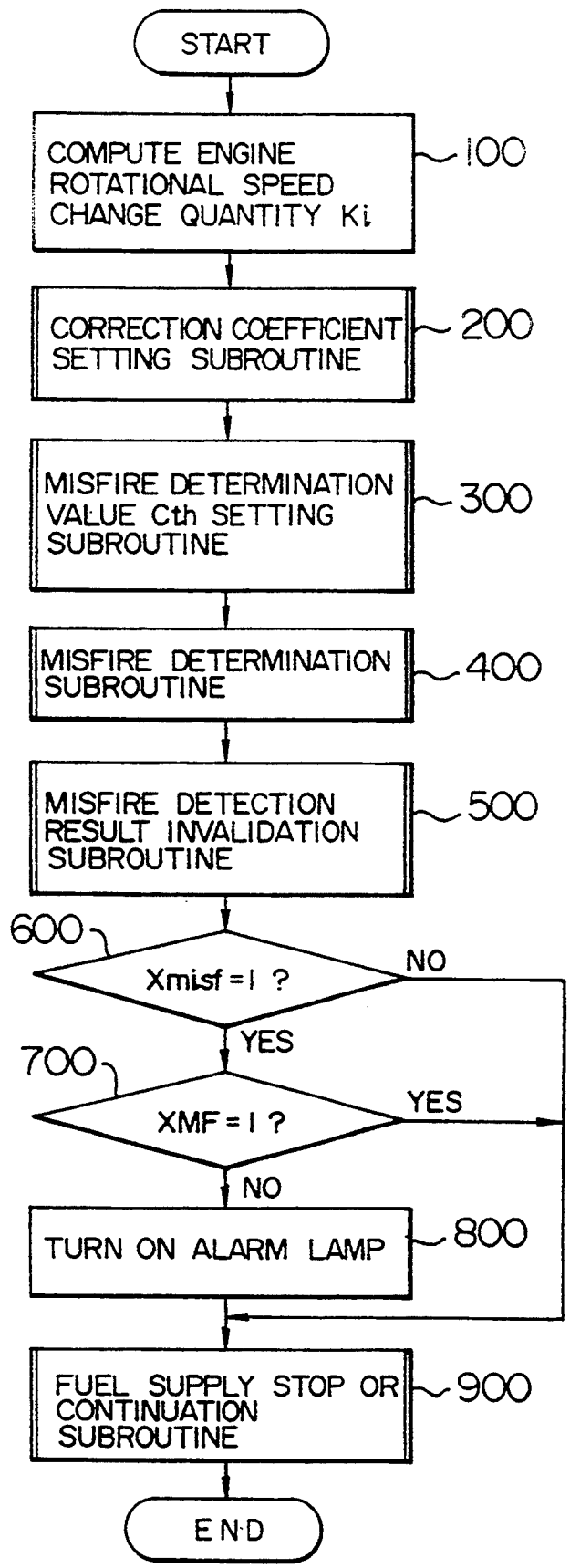
FIG. 4 shows a flow chart explaining the operation of the embodiment.

FIG. 4 shows a flow chart illustrating an operation of a misfire detection processing executed in the ECU 6. The illustrated routine is subjected to interrupt handling at every given crank angle (at every crank angle 180° C.A, since the engine has four cylinders in the present embodiment) based on information from the crank angle sensor 3.

Figure 3:
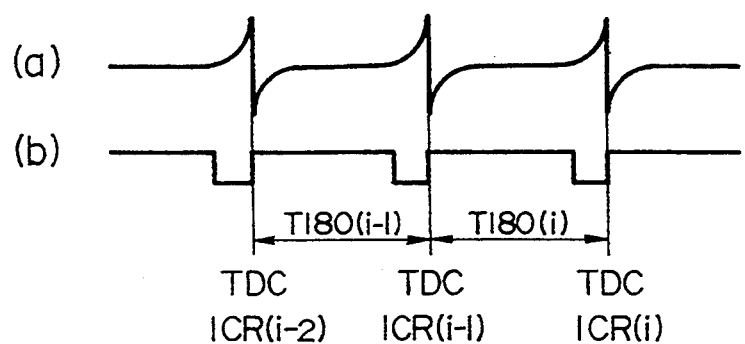
FIGS. 3(a) and 3(b) show waveforms for explaining the operation of the waveform shaping circuit shown in FIG. 2.

In step 100, a change quantity Ki of the rotational speed Ne of the engine is computed by detecting the time interval from a preceding rising edge to a current rising edge of the rectangular wave signal, which is shown in FIG. 3 in detail, based on the signal from the crank angle sensor 3. This change quantity computing processing will be described later in detail.

Step 200 is a correction coefficient setting subroutine for setting a correction coefficient to correct a misfire determination value Cth by detecting an engine load condition and an external (electrical) load condition.

Although a detailed description of this subroutine will be described later, this subroutine aims at correcting the misfire determination value Cth, since the change quantity Ki increases just after an external load is applied, for example, even under a normal operating condition where no misfire occurs.

Step 300 is a subroutine for setting the misfire determination value Cth. In this subroutine, an optimum misfire determination value Cth is set based on the correction value determined in step 200 and a shift position of the transmission, etc. This subroutine will also be described later in detail.

Step 400 is a misfire determination subroutine for determining whether a misfire has occurred in the internal combustion engine 1 by comparing the change quantity Ki obtained in step 100 with the misfire determination value Cth obtained in step 300. If it is determined that a misfire has occurred, a misfire occurrence flag Xmisf is set. The details of the determination processing will be described later in detail.

Step 500 is a subroutine for invalidating a result of the misfire determination performed in step 400, when it is determined that a current running condition of the vehicle is apt to give rise to mis-determination of a misfire. Although the subroutine will be described later in detail, a processing of setting a invalidation flag XMF is performed when it is determined that the running condition is apt to cause misdetermination of a misfire.

In step 600, a determination is made as to whether the misfire occurrence flag Xmisf has been set. If the flag has been set, the processing proceeds to step 700. If not yet set, then it is determined that no misfire has occurred and the processing proceeds to step 900.

In step 700, a determination is made as to whether the invalidation flag XMF has been set. If the flag has been set, the processing proceeds to step 900. If not yet set, the processing proceeds to step 800.

In step 800, the alarm lamp 22 is turned on to alarm a vehicle user, etc. that a misfire has occurred in the internal combustion engine 1, and then the processing proceeds to step 900.

Step 900 is a fuel supply stopping or continuing subroutine for executing a processing for stopping fuel supply to engine cylinders when a misfire has occurred. Although this subroutine will also be described later, this subroutine is intended to execute a processing to stop fuel supply to engine cylinders only when the engine is in an operation condition corresponding to a stored engine operating condition where a misfire has occurred. After the processing in this step has been completed, the present routine comes to an end, and the processing returns to the main routine.

Now, the processes in steps 100 to 500 and step 900 in FIG. 4 will be described with reference to the drawings.

The processing to compute a change quantity Ki of an engine rotational speed Ne in step 100 shown in FIG. 4 will be described with reference to the flow chart shown in FIG. 5.

Figure 5:
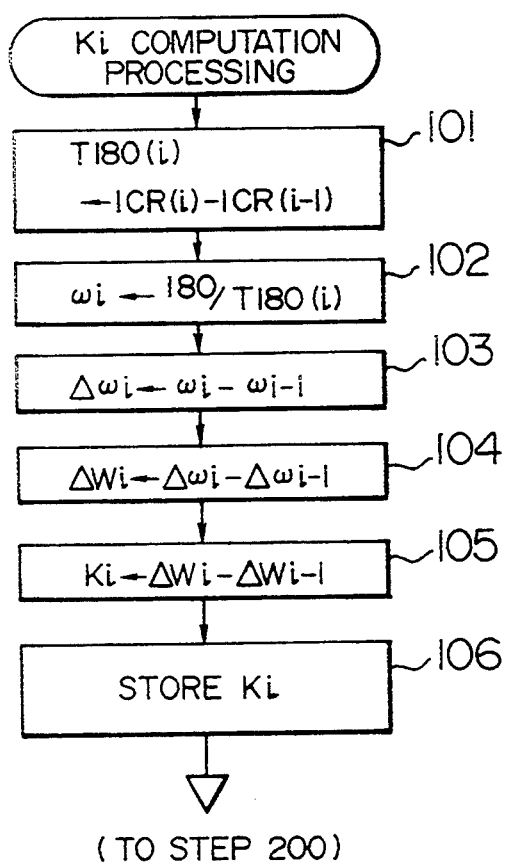
FIG. 5 shows a flow chart explaining the operation of computing a change quantity Ki in step 100 shown in FIG. 4.

In FIG. 5, as has been described above, step 101 determines a time period T180(i) which is required for the crank shaft to rotate between two TDC's of the engine by subtracting the time ICR(i−1) at a preceding rising edge from the time ICR(i) at a current rising edge of the rectangular wave signal shown in FIG. 3(b). Step 102 computes an average rotational angular speed $\Omega_i$ between two TDC's in accordance with a formula $\Omega_i = 180/T180$ (i) by using T180 (i) obtained in step 101. In next step 103, a deviation $\Delta\Omega_i$ between a current average rotational angular speed i and a preceding average rotational angular speed $\Omega_{i-1}$ is obtained. In step 104, a change quantity $\Delta W_i$ of a deviation between two average rotational angular speeds is obtained by subtracting a preceding deviation $\Delta\Omega_{i-1}$ between two average rotational angular speeds from a current deviation $\Delta\Omega_i$ between two average rotational angular speeds. In step 105, a change quantity Ki of a change quantity $\Delta W_i$ of a deviation is obtained by subtracting a preceding change quantity $\Delta W_{i1}$ of a deviation from a current change quantity $\Delta W_i$ of a deviation. In step 106, change quantities Ki, which are computed by the above-mentioned processes, are stored in the storage device 9 of the ECU 6, and then the present routine comes to an end.

Further, the results of computation processes from steps 102 to 105 are stored in the storage device 9 of the ECU 6 and are readout as preceding values from the storage device 9 before respective computation.

A correction coefficient setting subroutine in step 200 shown in FIG. 4 will be described with reference to a flow chart of FIG. 6.

In step 203, a determination as to whether fuel supply to engine cylinders is presently stopped is made. If fuel supply to engine cylinders is not stopped, the processing proceeds to step 204, while, if fuel supply to engine cylinders is stopped, the processing proceeds to step 205. The determination as to whether fuel supply to engine cylinders is stopped is carried out by checking whether a fuel injection pulse to the injector 12 is output.

In step 204, a time period Ta elapsed from the time of fuel supply resumption after a stop of fuel supply is computed. Then, a value of a fuel supply resumption time correction coefficient CKD1 (a part of a load change value), which is set at every given preset time (at every 100 ms in the present embodiment) in accordance with the elapsed time Ta, is obtained from a map shown in FIG. 7. Then, the processing proceeds to step 206.

In step 205, a constant CKD10 (CKD10=1.2 in the present embodiment) at the time of fuel supply stoppage representative of a stop of the fuel supply is set as a value of the fuel supply resumption time correction coefficient CKD1, and the processing proceeds to step 206.

In step 206, a determination as to whether the air conditioner is operating is made based on an output signal from the air conditioner switch 15. If the air conditioner is operating or is not operating, the processing proceeds to step 207 or 208, respectively.

In step 207, a time period $T_b$ elapsed from the start of operation of the air conditioner is computed, and a value of an air conditioner operation time correction coefficient CKD2, which is set at every given preset time (at every 100 ms in the present embodiment) in accordance with the elapsed time $T_b$, is obtained from a map shown in FIG. 8, and then the processing proceeds to step 209.

In step 208, a time period $T_c$ elaspsed from the stopping of the air conditioner is computed, and a value of an air conditioner stop time correction coefficient CKD3, which is set at every given time (at every 100 ms in the present embodiment) in accordance with the elapsed time $T_c$, is obtained from a map shown in FIG. 9, and the processing proceeds to step 209.

In step 209, fuel pressure FLP is read in accordance with a detection result of the fuel pressure sensor 14. In step 210, the fuel pressure FLP is compared with a given fuel pressure value KFP. If the FLP is smaller than a given fuel pressure value KLP, the processing proceeds to step 211. While, if the fuel pressure FLP is not lower than the given fuel pressure value KFP, the processing proceeds to step 212.

Here, the given fuel pressure value KFP is determined such that, with a fuel pressure value smaller than that, sufficient fuel is not supplied to a combustion chamber of the internal combustion engine and combustion becomes unstable. In the present embodiment, the given fuel pressure value KFP is preset to about 1.5 $Kg/cm^2$.

In step 211, since the fuel pressure FLP is determined not to be pressure that makes possible complete combustion in the engine, CKD40 is set as a fuel pressure correction coefficient CKD4, and the processing proceeds to step 213. On the other hand, in step 212, the value of the fuel pressure correction coefficient CKD4 is set to "0", and the processing proceeds to step 213.

In the present embodiment, the value of the CKD40 is preliminarily set to a value larger than a misfire determination permission constant KCKD (for example, CKD40=1.5).

In step 213, the values of the fuel supply resumption time correction coefficient CKD1, the air conditioner operation time correction coefficient CKD2, the air conditioner stop time correction coefficient CKD3, and the fuel pressure correction coefficient CKD4 are added together to obtain a misfire determination correction coefficient CKD.

In step 214, the misfire determination correction coefficient CKD obtained in step 213 is compared with the misfire determination permission constant KCKD (in the present embodiment, KCKD=1.0). Then, if the misfire determination correction coefficient CKD is not smaller than the misfire determination permission constant KCKD, it is determined that the engine is in such a condition that misdetection is apt to occur in the determination of a misfire, and the processing proceeds to step 215, in which an invalidation flag XMF for invalidating a result of a misfire determination in a misfire determination routine, which will be described later, is set, and this routine comes to an end.

On the other hand, if the misfire determination correction coefficient CKD is smaller than the misfire determination permission constant KCKD, the processing proceeds to step 216. In step 216, the misfire determination correction coefficient CKD is stored in the storage device 9 of the ECU 6, and this routine comes to an end. This misfire determination correction coefficient CKD is used in a misfire determination value setting routine described later.

Figure 6:
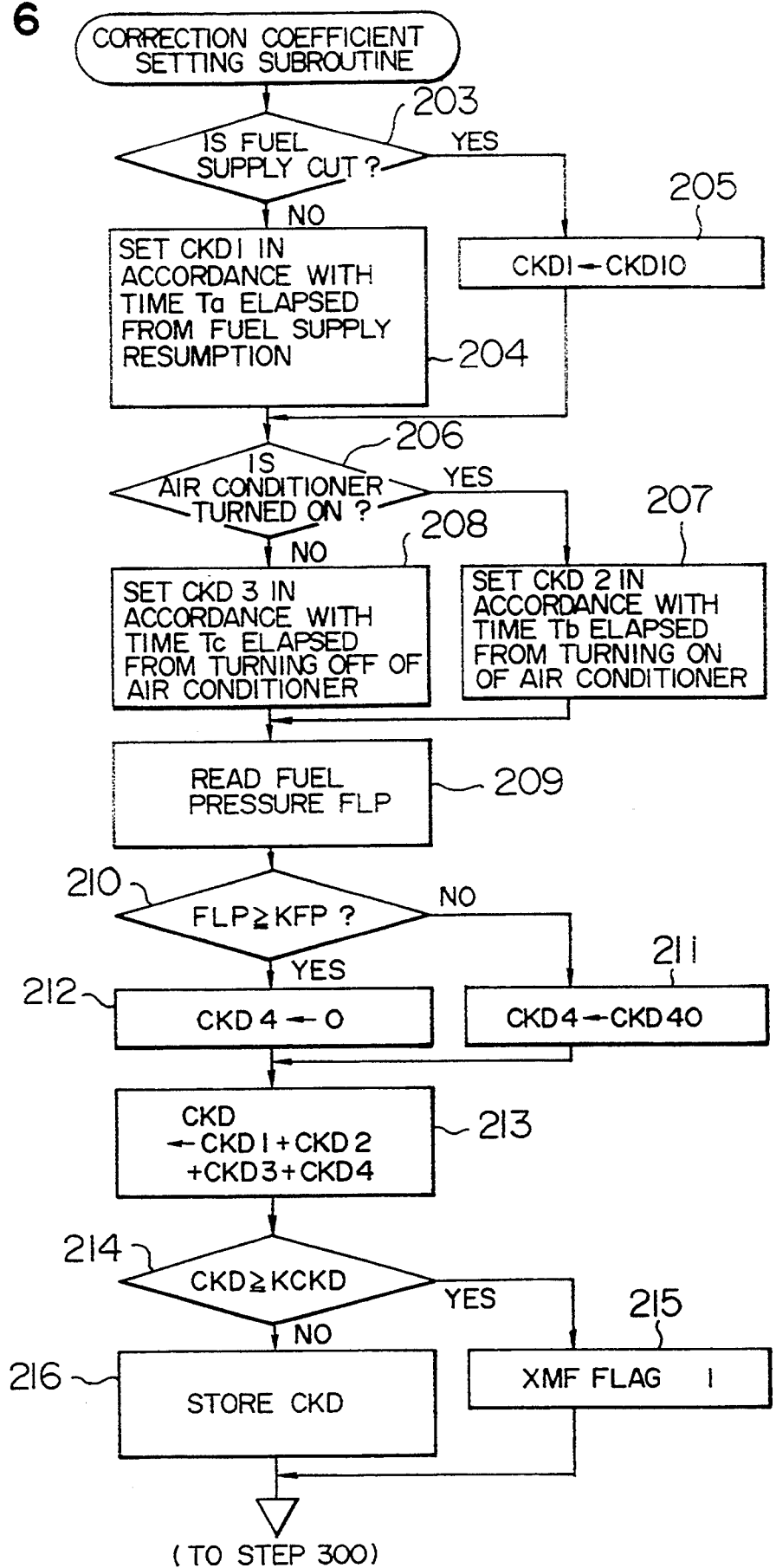
FIG. 6 shows a flow chart explaining the execution of a correction value setting subroutine in step 200 in FIG. 4.

Accordingly, a correction quantity of a basic misfire determination value CK can be changed at every elapsed time Ta by setting a value of the fuel supply resumption time correction coefficient CKD1 at every elapsed time Ta elapsed from a time point when fuel supply to engine cylinders is resumed, for example, as shown in FIG. 6. Since the engine rotational speed can not be brought into a steady state in a moment after fuel supply is resumed, misdetermination of a misfire can be prevented by invalidating a result of misfire determination in the misfire determination result invalidating subroutine or by setting a misfire determination value Cth to a large value in the misfire determination value setting subroutine.

In setting the values of the fuel supply resumption time correction coefficient CKD1, the air conditioner operation time correction coefficient CKD2, and the air conditioner stop time correction coefficient CKD3, though, for example, the fuel supply resumption time correction coefficient CKD1 is set at every given time lapse from the resumption of fuel supply, the value of the fuel supply resumption time correction coefficient CKD1 may be set at every ignition timing from the time when fuel supply has been resumed.

Further, though the load change value (misfire determination correction coefficient CKD) is set by detecting whether fuel supply is stopped or the air conditioner is operating, the load change value (misfire determination correction coefficient CKD) may be set by using the other parameters relating to a change of an operation condition of the engine, for example, by detecting the turning on or off of the clutch switch 21.

A misfire determination value Cth setting subroutine in step 300 shown in FIG. 4 will be described with reference to a flow chart shown in FIG. 10.

In step 301, a shift position of the transmission of the engine is read in accordance with a signal from the shift position sensor 20.

In step 302, a basic misfire determination value Ck for use in misfire determination, which is adapted to respective conditions of the internal combustion engine, is obtained. The basic misfire determination value Ck at this time is obtained from a two-dimensional map of the engine rotational speed and the load shown in FIG. 11 at the time of non-idling when the throttle opening is larger than a given opening. The value Ck is obtained from a one-dimensional map only of the engine rotational speed shown in FIG. 12 at the idling time. Schematic relations between the engine rotational speed and the basic misfire determination value Ck at the time of non-idling and idling are shown in FIGS. 13 and 14, respectively. The relations show tendencies that the basic misfire determination value Ck decreases as a rotational speed increases but the misfire determination value Ck increases as an engine load increases.

Figure 16:
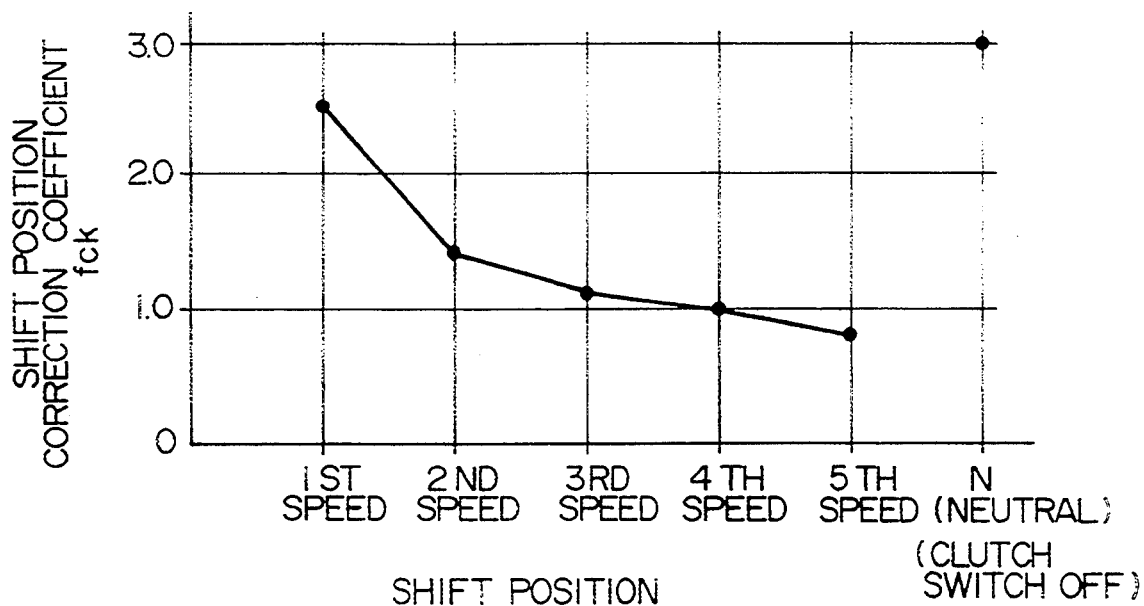
FIG. 16 is a characteristic diagram showing the relation between a shift position correction coefficient fck and the shift position.

In next step 303, a correction coefficient fck is selected in accordance with a shift position obtained in step 301 from a one-dimensional map only of the shift position shown in FIG. 15. Further, the correction coefficient fck is set to be a neutral coefficient fckn even when the shift lever has been operated, if the clutch switch 6 is turned off (the clutch is disengaged) as is known from an output signal from the clutch switch 6, to say nothing of a case in which the shift lever is in a neutral position. A schematic relation between the shift position correction coefficient fck and the shift position is shown in FIG. 16. As is apparent from FIG. 16, the shift position correction coefficient fck is set so that the shift position correction coefficient decreases as the shift lever is in higher shift positions, but the shift position correction coefficient assumes the largest value (3.0 in FIG. 16) in the neutral position or when the clutch switch has been turned off.

In step 304, the misfire determination correction coefficient CKD, which has been computed in the above-mentioned correction coefficient setting subroutine and has been stored in the storage device 9 in the ECU 6, is read.

In step 305, the misfire determination value Cth is set by multiplying the basic misfire determination value Ck with the shift position correction coefficient fck and the misfire determination correction coefficient CKD which have been obtained in steps 303 and 304, respectively. The misfire determination value Cth is stored in the storage device 9 in step 306, and then this subroutine comes to an end.

By executing the foregoing processes, an optimum misfire determination value Cth can be set in consideration of the fact that the change quantity Ki of a change quantity $\Delta W_i$ of a deviation of an average rotational angular speed of the engine 1 at the time when a misfire has occurred varies at every shift position.

As described in the foregoing, the basic misfire determination value Ck is further corrected by using the misfire determination correction coefficient CKD which has been obtained in the correction value setting subroutine in this embodiment.

Therefore, an optimum misfire determination value Cth can be set by considering external load conditions, for example, by having the misfire determination value Cth, just after an external load such as the air conditioner has been applied, set to a larger value so as to prevent misdetermination of a misfire from being caused by a decrease of an engine rotational speed just after the application of the external load.

Although the foregoing embodiments have been described with reference to a manual transmission, the present invention may be applied to an automatic transmission (hereinafter referred to as "AT"). An embodiment of the present invention when applied to an AT will be described hereunder.

In the case of an AT, the basic misfire determination value CK is also corrected by changing a correction value in accordance with the shift position.

Figure 17:
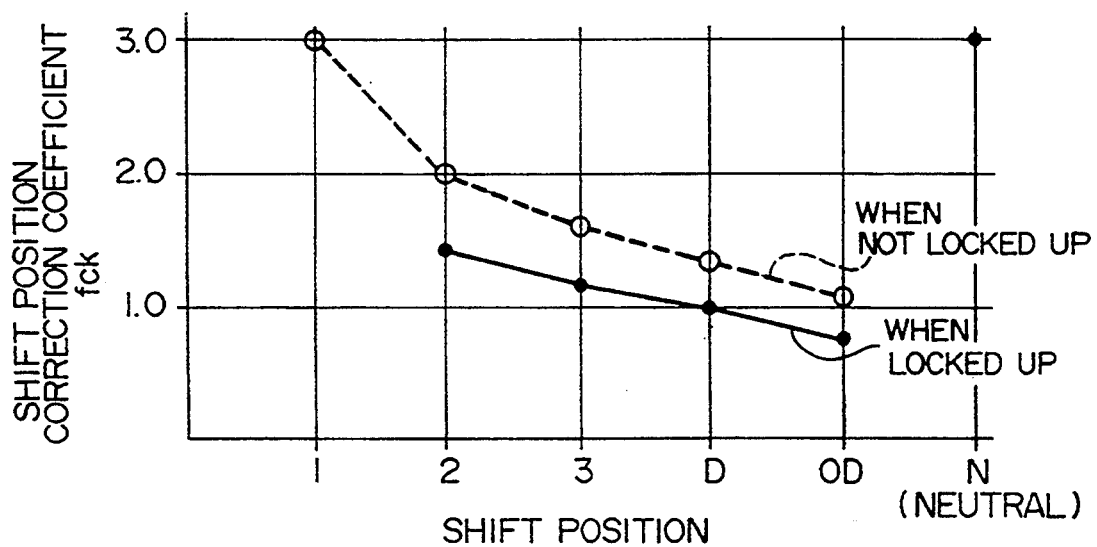
FIG. 17 is a characteristic diagram showing the relation between a shift position correction coefficient fck and the shift position when the transmission is locked up and not locked up.

However, some vehicles, in which torque transmission from the engine side to the transmission side performed via a fluid is changed to direct mechanical transmission (locked up condition) when certain conditions are reached, have been put into practical use. Since such an AT vehicle with lock up capability has different vehicle inertia weights when its transmission is locked up or not, in an embodiment of the present invention, the correction coefficient fck when the transmission is locked up is set to a value lower than the correction coefficient fck when the lock up is released, even in the same shift position, so that misfire detection with high precision can be attained. In other words, in case of an AT vehicle having lock up capability, a more optimum misfire determination value Cth can be set by reading information as to whether the transmission is locked up in addition to information relating to the shift position and setting the shift position correction coefficient fck as shown in FIG. 17.

The misfire determination processing in step 400 shown in FIG. 4 will be described with reference to FIG. 18.

In step 401, a misfire determination value Cthi, which has been obtained in the foregoing misfire determination value Cth setting subroutine, and a change quantity Ki of the engine rotational speed are read. In step 402, the misfire determination value Cthi is compared with the change quantity Ki. If the change quantity Ki is smaller than the misfire determination value Cthi, then the processing proceeds to step 403. If the change quantity Ki is larger than the misfire determination value Cthi, then the processing proceeds to step 406.

In step 403, a preceding change quantity Ki−1 and a preceding misfire determination value Cthi−1 are read, and they are compared with each other. If the preceding change quantity Ki−1 is smaller than the preceding misfire determination value Cthi−1, then the processing proceeds to step 404. While, if the former is larger than the latter, the processing proceeds to step 406.

In step 404, a change quantity Ki−2 before the preceding change quantity Ki−1 and a misfire determination value Cthi−2 before the preceding misfire determination value Cthi−1 are compared with other. If the change quantity Ki−2 is smaller than the misfire determination value Cthi−2, then the processing proceeds to step 405. While, if the former is larger than the latter, then the processing proceeds to step 406.

In step 405, it is determined that a misfire has occurred in the engine 1, and a misfire occurrence flag Xmisf is set to "1". In step 406, it is determined that no misfire has occurred, and the misfire occurrence flag Xmisf is set to "0".

In step 407, the preceding misfire determination value Cthi−1 and the preceding change quantity Ki−1 are updated by the current misfire determination value Cthi and the current change quantity Ki, and the updated values are stored in the storage device 9.

In step 408, the misfire determination value Cth−2 before the preceding misfire determination value Cth−1 and the change quantity Ki−2 before the preceding change quantity Ki−1 are updated by the preceding misfire determination value Cthi−1 and the preceding change quantity Ki−1, and the updated values are stored in the storage device 9. Then, this subroutine comes to an end.

FIGS. 19(a) to 19(e) show rotational speed change characteristics when the engine 1 is in a steady operating condition.

FIG. 19(a) is a characteristic diagram showing the relation between the engine rotational speed and the crank angle when the engine 1 is in a steady operating condition. In FIG. 19(a), a solid line represents the characteristics of the engine 1 when a misfire has occurred. A dotted line represents the characteristics of the engine 1 when the engine is in normal operation. FIG. 19(b) shows the relation between the crank angle and the average rotational angular speed between respective two TDC points of the engine 1, which is a result of the processing in step 102 shown in FIG. 5. FIGS. 19(c), 19(d) and 19(e) show results of the processes in steps 103, 104 and 105 shown in FIG. 5, respectively. If the value represented by a point (Z) in FIG. 19(e) is assumed to be the change quantity Ki used in step 402 in the misfire determination subroutine shown in FIG. 18, the change quantities represented by points (Y) and (X) become Ki−1 and Ki−2, respectively. If the change quantities are compared with the misfire determination value Cth shown in FIG. 19 (e), the change quantities represented by the points (X) , (Y) and (Z) satisfy the conditions of Ki<Ci, Ki−1>Ci−1, and Ki−2<Ci−2 in the determination processes in steps 402, 403 and 404 shown in FIG. 18, respectively. Accordingly, occurrence of a misfire in a region (Q) shown in FIG. 19(e) can be detected.

FIGS. 20(a) to 20(e) show rotational speed change characteristics when the engine 1 is in a transient condition. The engine 1 is in an accelerated condition in this embodiment. The rotational speed change characteristics in a region (R) shown in FIG. 20(e) in which a misfire has occurred is substantially similar to those in the region Q shown in FIG. 19(e). It is apparent from FIG. 20(e) that a misfire can be detected by the same detection method even when the engine is in such a transient condition.

Figure 20:
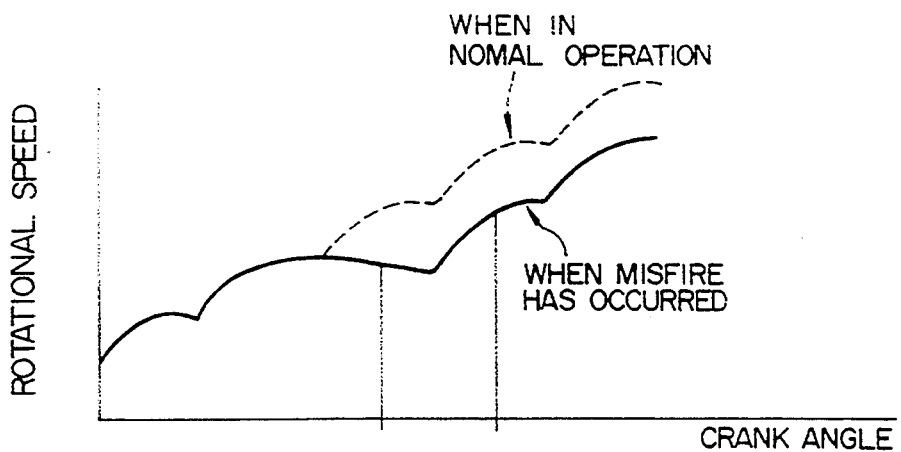
FIG. 20, (a) to (e) shows rotational speed change characteristics of the engine when the engine is in a transient condition.
Figure 20:
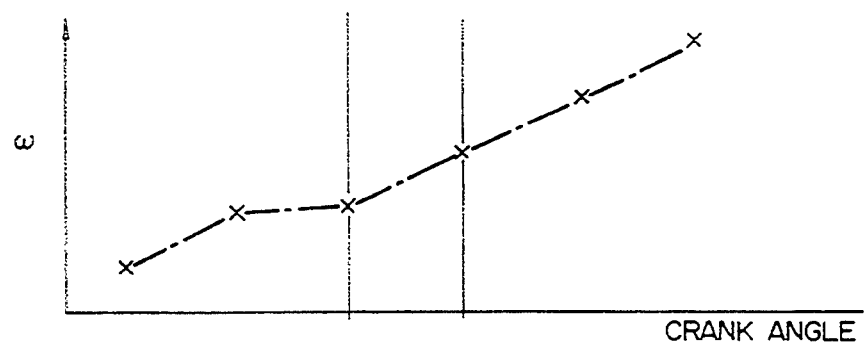
Figure 20:
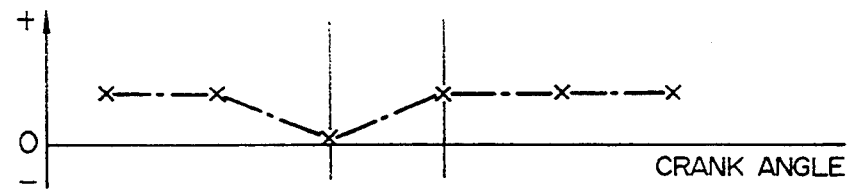
Figure 20:
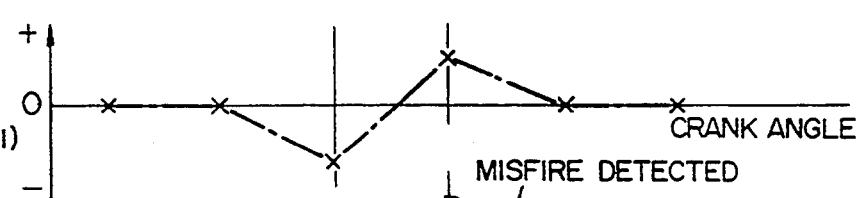
Figure 20:
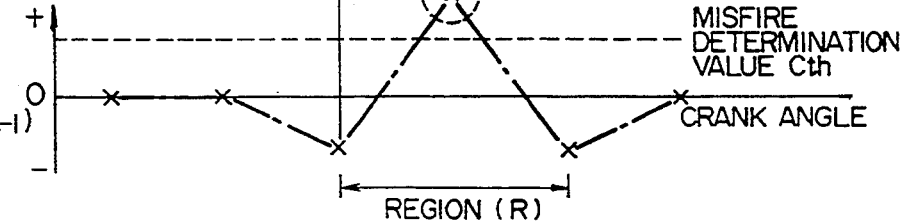

Accordingly, by virtue of the foregoing computation processes, more precisely, by obtaining the average rotational angular speed of the engine 1 and by differentiating the average rotational angular speed of the engine 1 three times, it is possible to effect misfire detection by one and the same method, since the results of the computation show the same rotational speed change characteristics, when a misfire has occurred both in transient and steady operating conditions, as shown in the regions (Q) and (R) shown in FIGS. 19(e) and 20, respectively.

Furthermore, the result Ki of a current three-time differentiating operation, the result Ki−1 of a preceding three-time differentiating operation, and the result Ki−2 of a three-time differentiating operation before the preceding three-time differentiating operation are respectively compared with the misfire determination value Cth, and determination of a misfire can be made based on the three magnitude relation patterns, whereby a specific engine rotational speed change pattern appearing at the time when a misfire has occurred can be recognized, so that it becomes possible to detect the occurrence of a misfire with high precision.

Although, in the above-described embodiments, the projections 2a are provided at respective crank angles where the piston is in a TDC position, and an average rotational angular speed between a preceding TDC and a current TDC is obtained, without being restricted to such a structure, projections may be provided to detect a region formed by given crank angles in one ignition cycle and an average rotational angular speed in this region may be obtained.

In the foregoing embodiment, an average rotational angular speed from a given crank angle to the next given crank angle is obtained, and the average rotational angular speed is subjected to differentiating operations three times, and the result of the three-time differentiation operations is compared with the misfire determination value Cth. While, a time period required for the crank to rotate from a given crank angle to the next given crank angle may be subjected to differentiating operations three times, and the result of the three-time differentiating operations may be compared with the misfire determination value Cth.

It has been described in the foregoing that misfire determination can be made by comparing the misfire determination value Cth, which is obtained in consideration of the shift position and the external load, with the change quantity Ki, even if the engine 1 is in a transient condition.

However, there is a possibility such that a result of misfire determination, which has been thus obtained, may be inaccurate due to an influence by vehicle running conditions.

Accordingly, a determination as to whether the misfire determination result is accurate is made, and, if the misfire determination result is determined to be inaccurate, a processing of a misfire detection result invalidation subroutine is carried out in a next step, without performing a fail processing with respect to the occurrence of a misfire.

Figure 21:
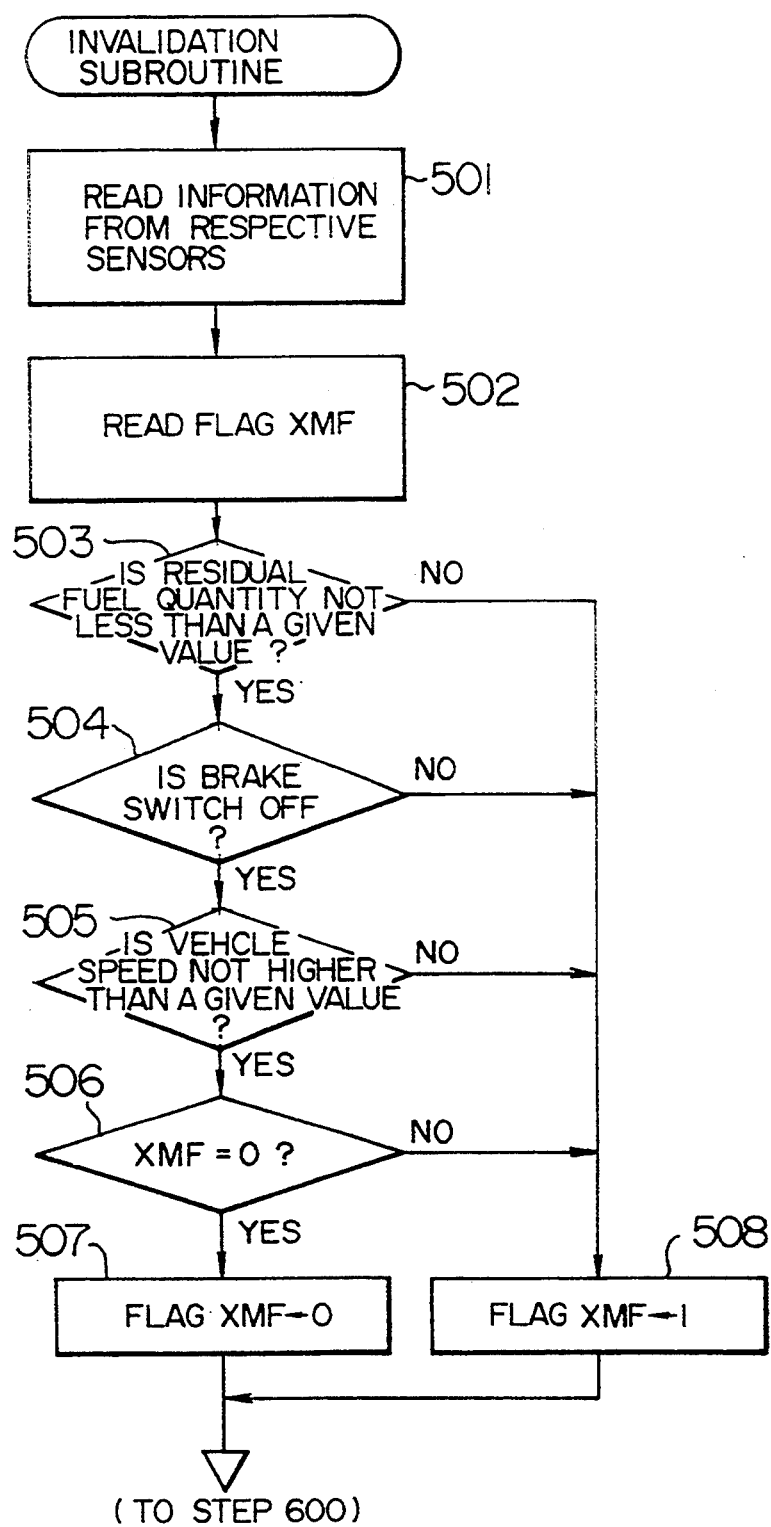
FIG. 21 shows a flow chart explaining the execution of a misfire detection result invalidating subroutine in step 500 in FIG. 4.

FIG. 21 shows a flow chart illustrating the processing of a misfire detection result invalidation subroutine in step 500 shown in FIG. 4. This subroutine will be described in detail with reference to FIG. 21.

In step 501, information including output signals of respective sensors for detecting various conditions of the vehicle such as the residual fuel quantity detector 18, the brake switch 19 and the vehicle speed sensor 16 are read. In step 502, an invalidation flag XMF, which has been set or reset in step 215 of the correction value setting subroutine as described with reference to FIG. 6, is read.

A determination as to whether a residual fuel quantity is not less than a given value (for example, 2 liters) is made in step 503. If the residual fuel quantity is not more than a given value, the processing proceeds to step 508, in order to avoid misdetection of a misfire caused by an increase in a change quantity of the rotational angular speed of the engine due to a shortage of fuel. If the residual fuel quantity is not less than a given value, the processing proceeds to step 504. A determination as to whether the brake switch 19 is turned on or off is made in step 504. If the brake switch 19 is turned on, the processing proceeds to step 508 in order to avoid misdetection of a misfire caused by an increase in a change quantity of the rotational angular speed of the engine, for example, due to abrupt braking. If the brake switch 19 is turned off, then the processing proceeds to step 505. A determination as to whether the vehicle speed is not higher than a given value (for example, 160 km/h) is made in step 505. If the vehicle speed exceeds a given value, that is, the vehicle is running at a high speed, then the processing proceeds to step 508 in order to avoid misdetection of a misfire, since a remarkably large impact may be transmitted to the engine 1 to increase a change quantity of the rotational angular speed of the engine 1 when the vehicle is running, for example, on a rough road. On the other hand, the processing proceeds to step 506, if the vehicle speed is not higher than a given value.

In step 506, a determination is made as to whether the invalidation flag XMF, which is detected in step 502, is set or not set. If the flag XMF is set, then the processing proceeds to step 508. If not set, then the processing proceeds to step 507.

In step 507, it is determined that the vehicle condition is in such a condition that misfire detection may be performed in the determination making steps 503, 504, 505 and 506, and the invalidation flag XMF is made "0". In step 508, it is determined that the vehicle condition is not suitable for performing misfire detection, and the invalidation flag XMF is made "1".

After the execution of the foregoing processes, this subroutine comes to an end, and the processing proceeds to step 400 shown in FIG. 4.

The precision of misfire detection can be remarkably elevated by executing the processes in step 500 shown in FIG. 4, that is, by detecting the running condition of the vehicle and invalidating a result of misfire detection as being not normal if it is determined that the vehicle is in a condition which is apt to give rise to misdetermination of a misfire.

The foregoing processes are executed by an engine controlling ECU in this embodiment. Recently, there has been seen a case where an electronic meter is used to effect a processing of the information from various sensors and to display a result of the processing. In this case, the computation processing in the foregoing misfire detection result invalidation subroutine is not performed by the engine controlling ECU (ECU 6 in the present embodiment), but it may be performed by an ECU for use in the electronic meter, and only the detection and setting of the invalidation flag XMF may be performed by the engine controlling ECU.

In other words, the present invention can be practiced at low cost by using a structure for performing the processes of the misfire detection result invalidation subroutine by using an ECU for use in an electronic meter, thereby making it unnecessary to provide a sensor for detecting the vehicle condition and a signal cable from the sensor.

It has been described hereinbefore that a misfire can be detected with high precision in all vehicle running conditions or engine operating conditions by performing the foregoing processes so that abnormality of an engine can always be accurately warned to a vehicle driver, etc.

When a misfire occurs, unburned fuel gas enters a catalyst, which causes the temperature of the catalyst to rise. As a result, there is the possibility that the catalyst is deteriorated or that afterburn occurs. Therefore, when it is determined that a misfire has occurred, fuel supply to the engine is stopped for the protection of the catalyst.

Next, a fuel supply stopping or continuing process in step 400 shown in FIG. 4 will be described.

Figure 22:
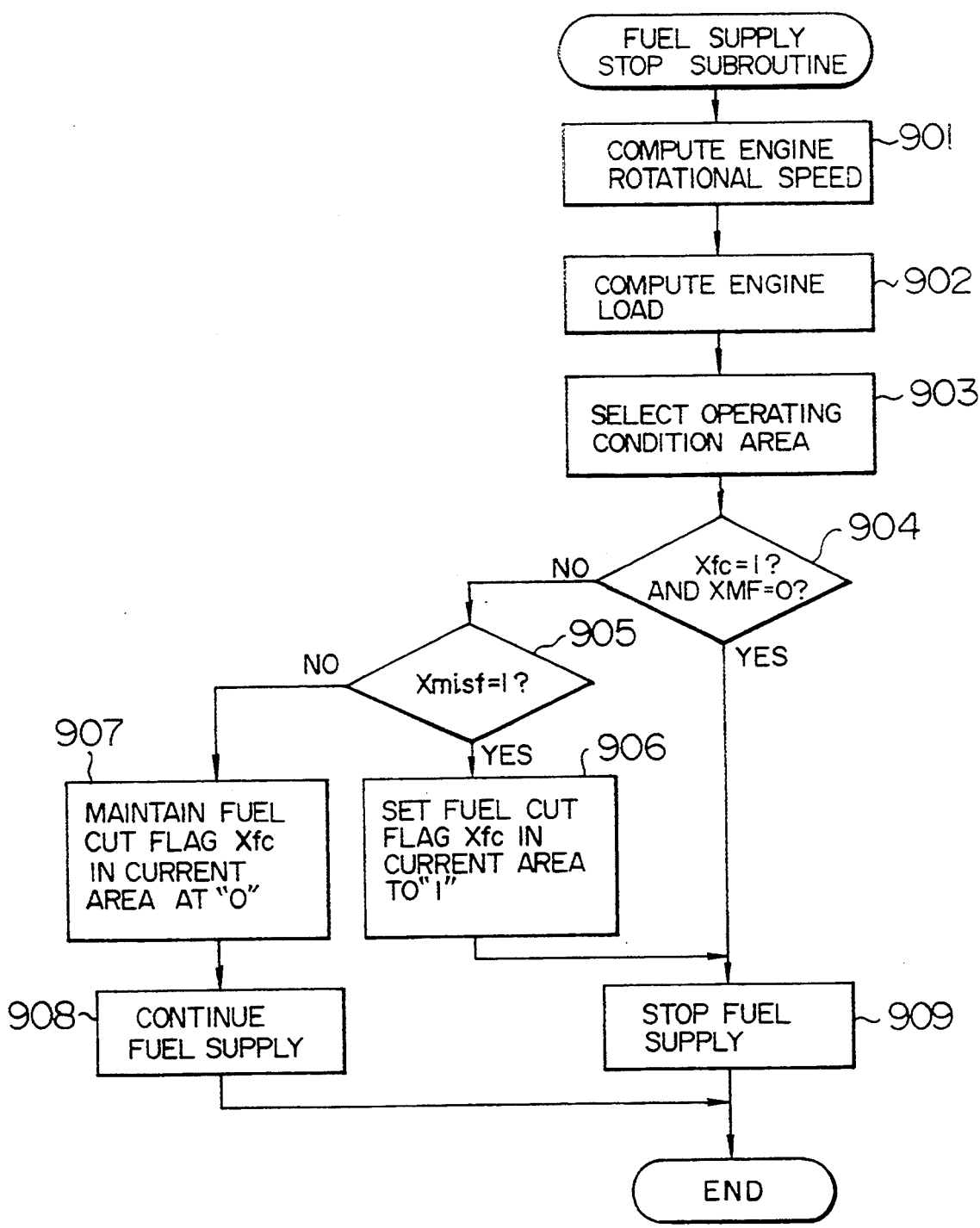
FIG. 22 shows a flow chart explaining the execution of a fuel supply stop or continuation subroutine in step 900 in FIG. 4.

FIG. 22 shows a flow chart for explaining this process.

Referring to FIG. 22, in step 901, a rotational speed of the crank shaft or the cam shaft of the engine 1 is computed based on a detection signal from the crank angle sensor 3. In step 902, a load on the engine is computed based on a detection signal from the intake pipe pressure sensor 5. In step 903, based on the results of the computation performed in steps 901 and 902, an area corresponding to a current engine operation condition is selected from areas contained in a two-dimensional map including a plurality of areas sectioned to store respective engine rotational speeds and loads on the engine and also the states of fuel cut flags $X_{fc}$ depending on whether each of the areas is a misfire occurring area or not, as shown in FIG. 23. The two-dimensional map shown in FIG. 23 is preliminarily stored in the storage device 9.

In step 904, a determination is made as to whether a fuel cut flag $X_{fc}$ in an area selected from the two-dimensional map shown in FIG. 23 is "1" and whether the invalidation flag XMF is "0". If the fuel cut flag $X_{fc}$ is "1" and the invalidation flag XMF is "0", then the processing proceeds to step 909. If the fuel cut flag $X_{fc}$ is not "1" and the invalidation flag XMF is not "0", then the processing proceeds to step 905

The fuel cut flag $X_{fc}$ at this time will be described hereinafter in detail.

Figure 18:
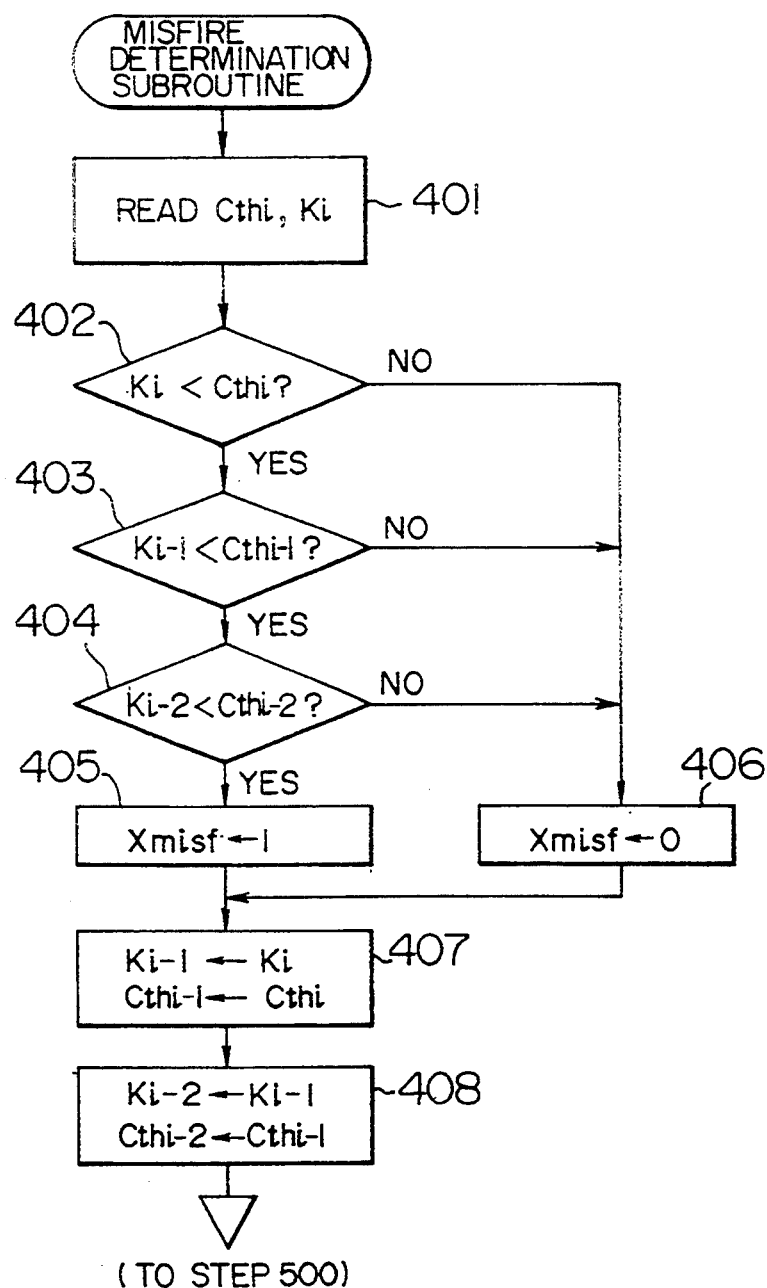
FIG. 18 shows a flow chart explaining the execution of a misfire determination subroutine in step 400 in FIG. 4.

In step 905, the misfire occurrence flag Xmisf, which is set in the misfire determination subroutine 400 shown in FIG. 4 and described with reference to FIG. 18, is read to determine whether a misfire has occurred. If Xmisf=1, that is, if it is determined that a misfire has occurred, the processing proceeds to step 906. If Xmisf=0, that is, if it is determined that no misfire has occurred, the processing proceeds to step 907.

In step 906, the fuel cut flag $X_{fc}$ in an area in the two-dimensional map of FIG. 23 corresponding to a selected current engine rotational speed Ne and a selected current engine load is set to "1" and the processing proceeds to step 909.

In step 907, the fuel cut flag $X_{fc}$ in a selected current area is maintained to be "0" and the processing proceeds to step 908 to continue fuel supply.

In step 909, based on the determination of $X_{fc}=1$ made in step 904 or the setting of $X_{fc}=1$ performed in step 906, the fuel supply is stopped. The fuel cut flag $X_{fc}$ is cleared in an initialization process performed at the start of the engine 1.

As described above, with the apparatus of the present embodiment, the fuel supply can be stopped and abnormal heating of the catalyst is prevented only when the current engine condition corresponds to an area in the two-dimensional map of FIG. 23 defined by an engine rotational speed and an engine load at the time when a misfire occurrence is confirmed, while, fuel supply can be continued, if the current engine condition corresponds to an area in which a condition of misfire occurrence is not confirmed.

If misfire occurs under a certain engine condition, but no misfire occurs under the other condition, the engine can always be efficiently operated without stopping fuel supply to engine cylinders.

When the apparatus of the present embodiment is applied to an internal combustion engine in which fuel is supplied by simultaneous fuel injection, since fuel supply is continued in the areas in which no misfire is detected, the number of areas in which fuel supply is stopped is reduced, and, as a result, it is made possible to perform fail-safe driving of a vehicle.

I claim:

1. An apparatus for detecting a misfire in an internal combustion engine, comprising:

rotational signal output means for outputting a rotational signal corresponding to every predetermined rotational position of said internal combustion engine;

average rotational angular speed computing means for computing an average rotational angular speed of said internal combustion engine based on said rotational signal output from said rotational signal output means;

deviation computing means for computing a deviation of a computation result of said average rotational angular speed computing means from an immediately previous computation result of said average rotational angular speed computing means, at every predetermined rotational position; and misfire determining means for determining if a misfire has occurred in said internal combustion engine, based on a pattern of a relative magnitude of a plurality of consecutive ones of said deviations computed by said deviation computing means at every predetermined rotational position.

2. An apparatus for detecting a misfire in an internal combustion engine as defined in claim 1, wherein said misfire determining means includes means for obtaining a difference between said relative magnitude of said plurality of consecutive ones of said deviations for every three predetermined rotational positions and for determining that a misfire has occurred in said internal combustion engine when three consecutive ones of said differences between said relative magnitude of said plurality of consecutive ones of said deviations vary, in order, by a decrease, an increase and a decrease.

3. An apparatus for detecting a misfire in an internal combustion engine, comprising:

rotational signal output means for outputting a rotational signal corresponding to every predetermined rotational position of said internal combustion engine;

average rotational angular speed computing means for computing an average rotational angular speed of said internal combustion engine based on said rotational signal output from said rotational signal output means;

deviation computing means for computing a deviation of a computation result of said average rotational angular speed computing means from an immediately previous computation result of said average rotational angular speed computing means, at every predetermined rotational position;

deviation difference computing means for computing a difference of said deviation computed by said deviation computing means at every predetermined rotational position from a deviation computed at a previous predetermined rotational position; and misfire determining means for determining if a misfire has occurred in said internal combustion engine, based on a pattern of a relative magnitude of a plurality of consecutive ones of said differences of said deviation computed by said deviation difference computing means, at every predetermined rotational position.

4. An apparatus for detecting a misfire in an internal combustion engine as defined in claim 3, further comprising:

operating condition detecting means for detecting an operating condition of said internal combustion engine, wherein said misfire determining means includes:
- misfire determination value obtaining means for obtaining a misfire determination value at every predetermined rotational position in accordance with said current operating condition of said internal combustion engine; and
- pattern determining means for determining said pattern of said relative magnitude of said consecutive ones of said differences of said deviation, based on said misfire determination values and said ones of said differences of said deviation corresponding thereto.

5. An apparatus for detecting a misfire in an internal combustion engine as defined in claim 4, wherein said pattern determining means includes means for determining that a misfire has occurred in said internal combustion engine when three consecutive ones of said differences of said deviation vary, in order, by a decrease, an increase and a decrease from an immediately preceding difference of said deviation.

* * * * *